United States Patent
Trainor et al.

(10) Patent No.: US 9,918,189 B2
(45) Date of Patent: *Mar. 13, 2018

(54) JURISDICTION BASED PARAMETER SETTING FOR WIRELESS TRANSCEIVERS

(71) Applicant: SiGe Semiconductor, Inc., Ottawa (CA)

(72) Inventors: Alan Trainor, Ottawa (CA); Grant Darcy Poulin, Carp (CA)

(73) Assignee: SiGe Semiconductor, Inc., Ottawa (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/172,705

(22) Filed: Feb. 4, 2014

(65) Prior Publication Data
US 2014/0155051 A1 Jun. 5, 2014

Related U.S. Application Data (63) Continuation of application No. 12/153,932, filed on May 28, 2008, now Pat. No. 8,675,680.
(Continued)

(51) Int. Cl.
*H04W 4/02* (2009.01)
*H04W 28/18* (2009.01)

(52) U.S. Cl.
CPC ............ *H04W 4/021* (2013.01); *H04W 4/02* (2013.01); *H04W 28/18* (2013.01)

(58) Field of Classification Search
CPC .. H04M 1/66–1/6775; H04M 1/72577; H04W 4/02–4/046; H04W 48/00–48/20;
(Continued)

(56) References Cited

U.S. PATENT DOCUMENTS

| 5,173,710 A | 12/1992 | Kelley et al. |
| 5,235,633 A | 8/1993 | Dennison et al. |

(Continued)

FOREIGN PATENT DOCUMENTS

| EP | 1 098 477 | 5/2001 |
| EP | 1 560 451 | 8/2005 |

(Continued)

OTHER PUBLICATIONS

EP Search Report and Written Opinion for Application No. EP 08 75 7158 dated Jan. 3, 2014 (7 pages).
(Continued)

*Primary Examiner* — Benjamin H Elliott, IV
*Assistant Examiner* — Prince A Mensah
(74) *Attorney, Agent, or Firm* — Knobbe, Martens, Olson & Bear, LLP (57) ABSTRACT

Low cost semiconductor manufacturing techniques have provided consumers with a wide range of electronic devices supporting communications according to multiple standards. These electronic devices will be deployed within many operational jurisdictions, particularly with roaming features, such as Japan, Europe, Asia-Pacific, South America and North America. However, operational compliance requirements can vary substantially with these different jurisdictions. Current electronic devices are designed, manufactured, calibrated and operated according to a specification providing compliance with broad range of operational jurisdictions despite the performance limitations this applies in many of the operational jurisdictions. Accordingly, there is provided a method of dynamically configuring the electronic device based upon a geographically based determination of the operational jurisdiction from global navigation systems data received by the electronic device. Based upon the determined operational jurisdiction, the operational param-
(Continued)

eters of a device's communication interfaces are adjusted for improving performance and efficiency of the device within these jurisdictions.

16 Claims, 11 Drawing Sheets

Related U.S. Application Data

(60) Provisional application No. 60/929,884, filed on Jul. 16, 2007.

(58) Field of Classification Search
CPC .... H04W 60/00–60/06; H04W 64/00–64/006; H04W 68/00–68/12; H04W 4/021; H04W 28/18
USPC .... 370/310.2, 338, 349, 401–402, 465, 466; 455/456.1–457
See application file for complete search history.

(56) References Cited

U.S. PATENT DOCUMENTS

| | | | |
|---|---|---|---|
| 5,396,647 | A | 3/1995 | Thompson et al. |
| 5,442,805 | A | 8/1995 | Sagers et al. |
| 5,581,261 | A | 12/1996 | Hickman et al. |
| 5,815,798 | A | 9/1998 | Bhagalia et al. |
| 5,857,155 | A | 1/1999 | Hill et al. |
| 6,011,973 | A * | 1/2000 | Valentine ............. H04W 48/04 342/357.59 |
| 6,014,568 | A | 1/2000 | Alperovich et al. |
| 6,201,973 | B1 | 3/2001 | Kowaguchi |
| 6,556,825 | B1 | 4/2003 | Mansfield |
| 6,597,906 | B1 * | 7/2003 | Van Leeuwen ......... H04W 4/02 455/422.1 |
| 6,636,744 | B1 | 10/2003 | Da |
| 6,983,156 | B2 * | 1/2006 | Fukushima et al. ....... 455/456.1 |
| 7,006,837 | B2 | 2/2006 | Shiota et al. |
| 7,076,255 | B2 | 7/2006 | Parupudi et al. |
| 7,352,733 | B2 * | 4/2008 | Green .......................... 370/338 |
| 7,599,700 | B2 | 10/2009 | Shinozaki |
| 7,684,438 | B2 | 3/2010 | Stephens et al. |
| 7,869,804 | B2 | 1/2011 | Kim et al. |
| 2001/0044312 | A1 * | 11/2001 | Yamane ....................... 455/456 |
| 2002/0061754 | A1 | 5/2002 | Takano |
| 2002/0107032 | A1 | 8/2002 | Agness et al. |
| 2002/0183069 | A1 | 12/2002 | Myr |
| 2003/0045302 | A1 | 3/2003 | Oda et al. |
| 2003/0050089 | A1 | 3/2003 | Hiroyasu et al. |
| 2003/0060201 | A1 | 3/2003 | Soliman |
| 2003/0069043 | A1 | 4/2003 | Chhaochharia et al. |
| 2004/0137913 | A1 | 7/2004 | Masuda |
| 2004/0176111 | A1 | 9/2004 | Wilhelm |
| 2004/0192336 | A1 * | 9/2004 | Walby ........................ 455/456.1 |
| 2004/0203989 | A1 | 10/2004 | Karaoguz |
| 2005/0049021 | A1 | 3/2005 | Nedelcu et al. |
| 2005/0096045 | A1 | 5/2005 | Palmer et al. |
| 2005/0136941 | A1 | 6/2005 | Junichi et al. |
| 2005/0143090 | A1 | 6/2005 | Dowling |
| 2005/0146460 | A1 | 7/2005 | Westerberg |
| 2005/0277427 | A1 | 12/2005 | Zhang |
| 2006/0063560 | A1 | 3/2006 | Herle |
| 2006/0105777 | A1 * | 5/2006 | Shinozaki .................. 455/456.1 |
| 2007/0077946 | A1 | 4/2007 | Benco et al. |
| 2008/0004000 | A1 | 1/2008 | Boss et al. |
| 2008/0130555 | A1 | 6/2008 | Kalhan |

FOREIGN PATENT DOCUMENTS

| | | |
|---|---|---|
| GB | 2313260 | 11/1997 |
| GB | 2348568 | 10/2000 |
| GB | 2371713 | 7/2002 |
| WO | WO 2004/049741 | 6/2004 |

OTHER PUBLICATIONS

ISA/CA, "International Search Report", dated Sep. 15, 2008, pp. 1 to 3.

Examination Report issued in Application No. GB08757158.4, dated Jan. 12, 2015, in 6 pages.

* cited by examiner

PRIOR ART

Fig. 7A

PRIOR ART

JURISDICTION BASED PARAMETER SETTING FOR WIRELESS TRANSCEIVERS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field of the Invention

The invention relates to controlling a wireless transceiver, and more particularly to establishing control and performance parameters based upon a determination of jurisdiction.

Description of the Related Art

In recent years, the use of wireless and RF technology has increased dramatically in portable and hand-held units, with them not only widespread, but increasingly pervasive, as with their uses including telephony, Internet e-mail, Internet video, Internet web browsers, global positioning, photography, navigation systems, in-store navigation, and linking peripherals to host devices. The number of cellular telephone subscribers alone worldwide is expected to reach 3 billion by the end of 2008, up from 2.1 billion in 2005, according to the International Telecommunication Union (ITU). In 2006 the number of cellular phone subscribers exceeded 200 million within the United States of America.

Similarly the devices incorporating wireless technology have expanded, and continue to so, including today not only cellular telephones, but Personal Digital Assistants (PDAs), laptop computers, palmtop computers, gaming consoles, wireless local area networks, wireless hubs, printers, telephone headsets, portable music players, point of sale terminals, global positioning systems, inventory control systems, and even vending machines. These wireless devices interface to wireless infrastructures that can support data, voice and other services on either single or multiple standards, and where these international standards also have geographic aspects to providing a wireless device operating in compliance with the standard. Typical examples of wireless standards in significant deployment today include but are not limited to:

WiFi [ANSVIEEE Standard 802.11];
WiMAX [IEEE Standard 802.16];
Bluetooth [IEEE Standard 802.15.1];
ZigBee [IEEE Standard 802.15.4];
Industrial, Scientific and Medical (ISM) [International Telecommunications Union Recommendations 5.138, 5.150, and 5.280]; and
GSM 850/900/1800/1900 [European Telecommunications Standards Institute (ETSI)] and it's extensions General Packet Radio Service (GPRS) and Enhanced Data rates for GSM Evolution (EDGE).

Of these, GSM service is used by over 2 billion people across more than 212 countries and territories. The ubiquity of the GSM standard makes international roaming practical between mobile phone operators, enabling subscribers to use their phones in many parts of the world, with the geographic coverage determined according to whether the cellular telephones are dual, tri-band or quad-band. WiFi (WLAN) communication has also enjoyed overwhelming consumer acceptance worldwide, generally as specified in IEEE 802.11a (operating in the frequency range of 4900-5825 MHz) or IEEE 802.11b and IEEE 802.11g specifications (operating in the range 2400-2485 MHz). These standards seem destined to survive and thrive in the future, for example with the IEEE 802.11n MIMO physical layer. The 802.11 value proposition is the provision of low cost, moderate data communication/transport rates and simple network function.

WiMAX (WMAN) communication is also preparing to deploy massively worldwide, especially as IEEE 802.16e (operating at two frequency ranges, the first being 2300-2690 MHz, and the second of 3300-3800 MHz). The IEEE 802.16e value proposition is the provision of moderate cost and data communication 1 transport rates with high quality of service, which requires higher system performance and complexity.

Whilst the general systems are covered by umbrella specifications, such as IEEE 802.11 (WiFi), and GSM, the standards provide for variations in performance that may be at the continental, country, and regional level. For example, GSM utilizes the 900 MHz/1800 MHz bands across Europe whilst coverage in North America exploits the 850 MHz/1900 MHz bands due to legacy infrastructure operating in these other bands. Similarly, WiFi (IEEE 802.11) is strictly 802.11a, 802.11b and 802.11g with 802.11n in development. IEEE 802.11a operating in the frequency range of 4900-5825 MHz has regional variations such that Japan provides 11 channels within two frequency bands, Europe 19 channels within 2 frequency bands, and North America 23 channels across 4 frequency bands.

What is not generally evident to even so-called knowledgeable users is that whilst some frequency bands are common, for example channels 36-48, 52-64, and 102-140 in both North America and Europe, the performance specifications for the transmitters within the two territories are different in respect of allowed maximum transmitter output power, band edge rejection to neighboring channels, and levels of harmonics. Accordingly, a manufacturer of an electronic device capable of operating within both jurisdictions, and transferred arbitrarily between them, must make the transmitter compliant to both. Within current high volume commodity electronics, an efficient solution is to provide a device that is compliant to the minimum common overlap within the specifications of the two jurisdictions.

For example, consider an electronic device operating according to IEEE 802.11a, and the sub-set of channels 36-64, having centre frequencies between 5180 MHz and 5320 MHz. For channels 36 to 48 in North America, FCC regulations as described in CFR47, part 15, section 15.407, provide for a maximum conducted transmitter output power of +16 dBm, and on channels 52-64 an output power of +23 dBm. In contrast, Europe provides a maximum output power of +23 dBm EIRP for all these channels. Since antenna gains are approximately 4 dBi for most 802.11a radios, the maximum allowed transmit power in Europe will therefore be approximately 19 dBm. Hence, designing the system to ensure compliance to channels 36-64 in both jurisdictions results in establishing the maximum output power of the transmitter at +16 dBm, since the selection of the channel that the device will employ will depend not only upon which jurisdiction it is within but also local infrastructure deployed and current channel assignments. As such, the device will be operating in Europe at 3 dB lower output power, and in North America for channels 52-64 at 7 dB lower output power than specifications allow. The result is a device that, whilst compliant and operating in all jurisdictions, will provide the user with either reduced range from a base station, increased dead zones from lack of available base stations, or reduced data rates for data transfer.

Clearly, whilst the manufacturer trades optimum performance within each jurisdiction for simplicity of manufacture, global distribution of single common assembly, and confidence III compliance with the jurisdictions, the user suffers unnecessary performance limitations affecting their use of the electronic device, wireless electronics, etc. in general and potentially reduced satisfaction with the manufacturers' brand.

It would therefore be desirable to provide an electronic device to automatically determine the jurisdiction under which it is currently operating, and to therefore adjust the control settings of the wireless transmitter accordingly for improved performance, whilst ensuring compliance with local jurisdiction regulations and requirements. Further, it would be advantageous for the electronic device to do so without interacting with the local network to either avoid non-compliant transmissions during set-up within a new jurisdiction or allow existing communications to continue without interruption as the jurisdiction changes with the users' movements.

SUMMARY

In accordance with the invention there is provided a method comprising providing a wireless circuit operating according to a first wireless standard, the wireless circuit comprising at least one of a transmitter and a receiver. The method further comprising providing a wireless receiver for receiving a location signal, the wireless receiver co-located proximate to the wireless circuit and operating according to a second other wireless standard and determining at least an indication of an operational jurisdiction of the wireless circuit in dependence upon at least the location signal. The method then modifying at least an aspect of the wireless circuit in dependence upon at least the determined operational jurisdiction.

In accordance with another embodiment of the invention there is provided a method comprising providing a circuit supporting data communications according to a communications standard. The method further comprising providing a wireless receiver for receiving a location signal, the wireless receiver proximate to the circuit and operating according to a first wireless standard and determining at least an indication of an operational jurisdiction of the circuit in dependence upon at least the location signal. The method then configuring an aspect of the data communications of the circuit in dependence upon at least the determined operational jurisdiction.

In accordance with another embodiment of the invention the method in dependence of the determined operational jurisdiction provides for modifying an aspect of the wireless circuit. The method providing for adjusting at least one of a bandwidth of a tunable filter, a center frequency of a tunable filter, the rejection qualities of the filter, the loss of the filter, an output power of an amplifier, the magnitude of out-of-band emissions from the amplifier, a bias control voltage applied to an amplifier, the susceptibility of the amplifier to saturation, the robustness of the amplifier to overload conditions, the linearity of the amplifier, the noise figure of the amplifier, the linearity of the down conversion mixer, the input dynamic range of the analog to digital converter, the spurious dynamic range of the analog to digital converter, the gain of the amplifier, the correlation gain of the receiver, the number of correlation fingers processing the signal, and the distribution between hardware and software correlation.

BRIEF DESCRIPTION OF THE DRAWINGS

Exemplary embodiments of the invention will now be described in conjunction with the following drawings, in which.

DETAILED DESCRIPTION

Figure 1:
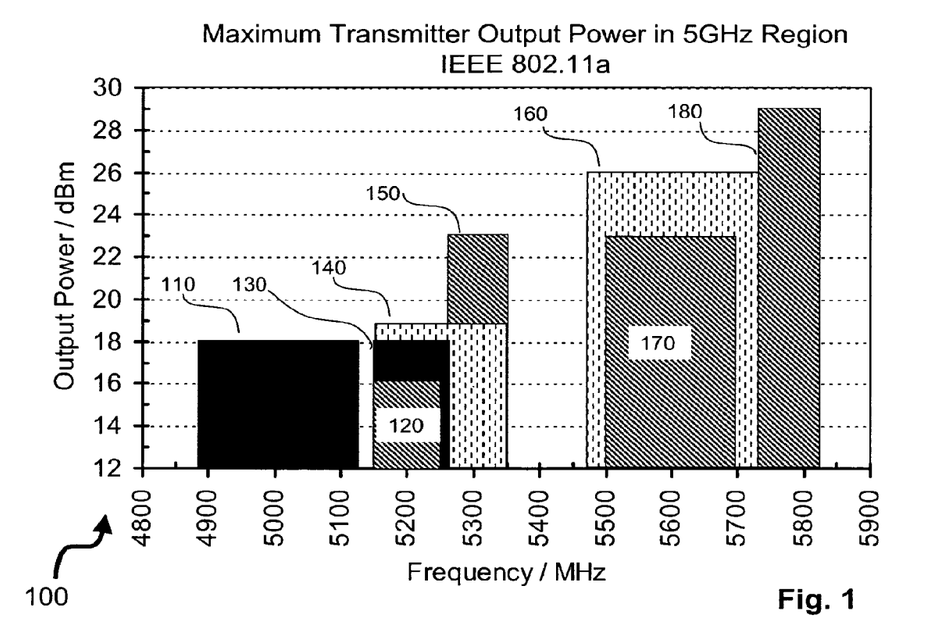
FIG. 1 illustrates the maximum output power of a wireless transmitter operating according to IEEE 802.11a in the 5 GHz band for three regional jurisdictions.

Referring to FIG. 1 shown is a first graphical representation 100 of part of the IEEE 802.11a specifications in respect of the maximum output power of a wireless transmitter operating in the 5 GHz band for three regional jurisdictions, North America, Europe and Japan. Accordingly, considering the Japanese jurisdiction there is a Japan Band A 110 covering 4.88 GHz-5.12 GHz, and a Japan Band B 130 covering 5160-5240 MHz with a maximum output power of +22 dBm EIRP. Assuming a 4 dBi antenna gain, this is equivalent to +18 dBm conducted transmit power.

Overlapping in frequency range the Japan Band B 130 are North America UNII-I 120 and Europe Band A 140. Considering initially the North America U-NII-I 120 then this covers 5.15 GHz to 5.25 GHz and provides a maximum output power for a compliant transmitter of +16 dBm, whilst Europe Band A covers operation within the frequency range 5.15 GHz to 5.35 GHz with maximum power +19 dBm. Finally, within this grouping is North America U-NII-2 150 covering 5.25 GHz to 5.35 GHz and providing maximum output power of +23 dBm. As a result of the overlapping bands and power output limitations, an electronic device operating at controlled channel 48 (5.240 GHz) and compliant with +16 dBm output is sacrificing 2 dB and 3 dB increases in possible output as the user takes the electronic device to Japan and Europe, respectively. For the next controlled channel, being channel 52 (5.260 GHz), the existing prior art devices, as discussed below in respect of FIGS. 7A and 7B, would be configured for +16 dBm output, such that now, not only does the electronic device sacrifice the same 2 dB and 3 dB in respect of deployment in Japan and Europe, but it is also sacrificing a 7 dB power increase in operation within regions providing North America U-NII-2 150 coverage.

Completing the regional standards for IEEE 802.11a in the 5 GHz band as shown in FIG. 1 are Europe Band B 160 covering 5.47 GHz to 5.725 GHz with maximum output +26 dBm (assuming 4 dBi antenna gain, with a 30 dBm EIRP limit), North America Band U-NII-2.5 170 for 5.50 GHz-5.70 GHz at maximum +23 dBm, and North America U-NII-3 180 for 5.725 to 5.825 GHz at a significantly higher output power of +29 dBm. Accordingly, it would be evident that existing implementations of electronics devices for compliance to IEEE 802.11a in North America would provide compliance for North America U-NII-I 120 and whilst sacrificing a very significant 13 dB of output power available when operating in North America U-NII-3 180.

Figure 2:
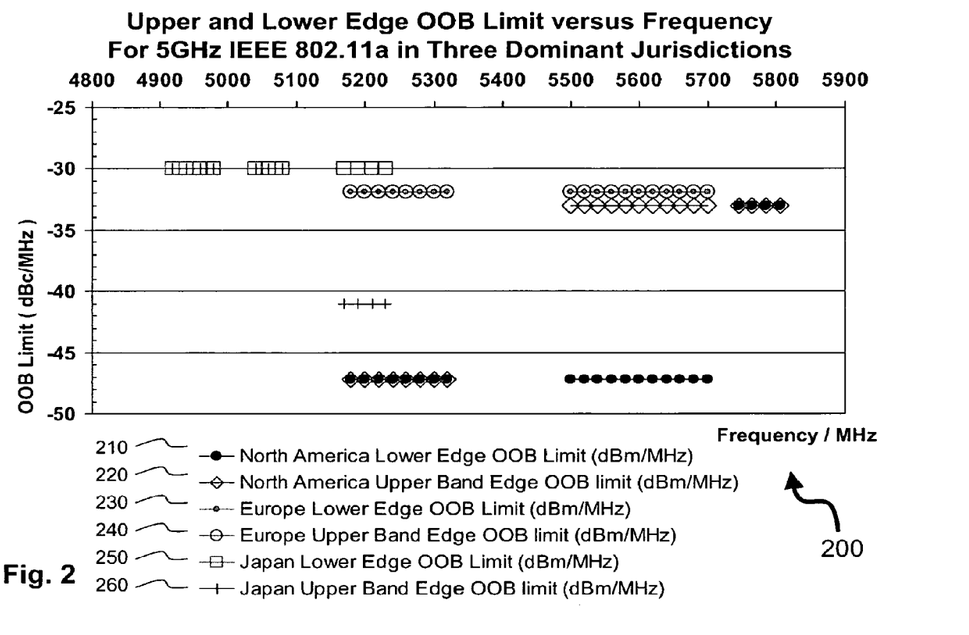
FIG. 2 illustrates the maximum out-of-band transmission level for a wireless transmitter operating according to IEEE 802.11a within the 5 GHz band for three regional jurisdictions.

Second graphical representation 200, shown in FIG. 2, depicts the out-of-band signal (OOB) limits for a wireless transmitter operating in the same three regional jurisdictions. Accordingly, this shows that compliance to regional jurisdictions for worldwide regulatory specifications is not solely about providing a transmitter with output power at maximum allowable output for each band within a specific jurisdiction. Many other aspects of the transmitter and resulting transmitted signal must be considered. As shown in the second graphical representation 200, the upper edge OOB limits are plotted as a function of frequency for the three regional jurisdictions of North America, Europe and Japan for consistency with FIG. 1. Accordingly, North American Lower Edge OOB 210 is approximately −47 dBm/MHz within North America U-NII-I 120, North America U-NII-2 150 and North America U-NII-2.5 170 but rises to −33 dBm/MHz for North America U-NII-3 180. In contrast, North American Upper Edge OOB 220 is approximately −47 dBm/MHz within North America U-NII-I 120 and North America U-NII-2 150 but rises to −33 dBm/MHz for North America U-NII-2.5 170 and North America U-NII-3 180.

Japan specifies for Japan Lower Edge OOB 250 as −30 dBm/MHz for both Japan Band A 110 and Japan Band B 130, and Japan Upper Edge OOB 260 as −30 dBm/MHz for Japan Band A 110 and −41 dBm/MHz for Japan Band B 130 (assuming 4 dBi antenna gain). In contrast, Europe is relatively straightforward requiring compliance to approximately −32 dBm/MHz for both Europe Lower Edge OOB 230 and Europe Upper Edge OOB 240 for both Europe Band A 140 and Europe Band B 160 (assuming 4 dBi antenna gain).

Figure 3:
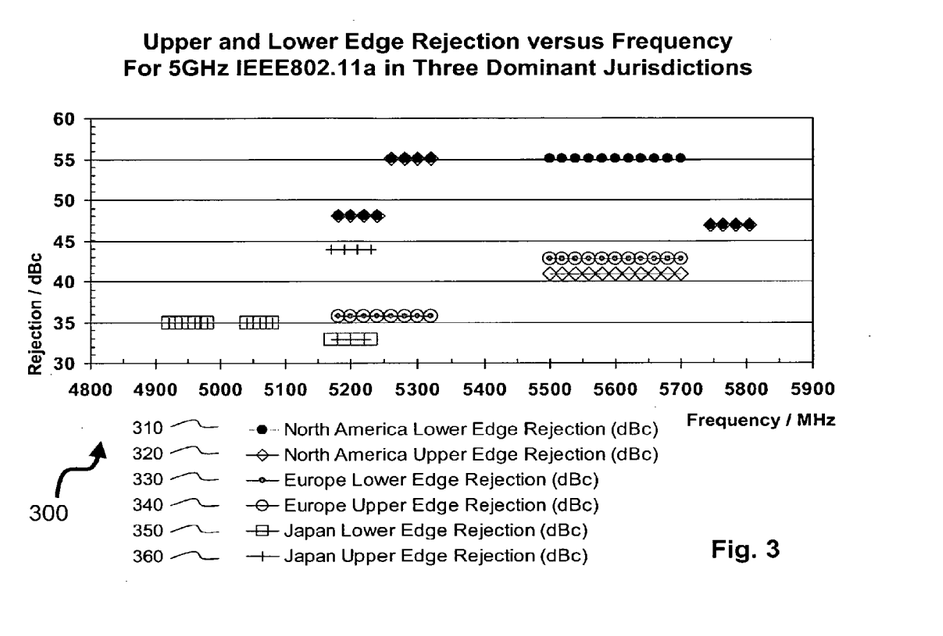
FIG. 3 illustrates the rejection required for signals out-of-band for a wireless transmitter operating according to IEEE 802.11a within the 5 GHz band for three regional jurisdictions.

Now referring to FIG. 3, there is provided a third graphical representation 300 of the IEEE 802.11a specifications which translates the lower edge and upper edge OOB requirements of second graphical representation 200 into upper and lower edge rejection specifications for the transmitter. Accordingly, North American Lower Edge Rejection 310 is approximately −48 dBr within North America U-NII-I 120, approximately −55 dBr in North America U-NII-2 150 and North America U-NII-2.5 170, and drops to approximately −47 dBr North America U-NII-3 180. In contrast, North American Upper Edge Rejection 320 is approximately −48 dBr within North America U-NII-I 120, approximately −55 dBr in North America U-NII-2 150 and North America U-NII-2.5 170, before reducing to −47 dBr in North America U-NII-3 180.

In respect of the regional jurisdiction of Japan, the appropriate sections of Japanese regulatory requirements require a Japan Lower Edge Rejection 350 as −35 dBr for both Japan Band A 110, −33 dBr for Japan Band B 130, and then Japan Upper Edge Rejection 360 as −35 dBr for Japan Band A 110 and −44 dBr for Japan Band B 130. Finally, Europe requires that both Europe Lower Edge Rejection 230 and Europe Upper Edge Rejection 240 are approximately −36 dBr in Europe Band A 140 and approximately −43 dBr in Europe Band B 160 respectively.

Figure 4:
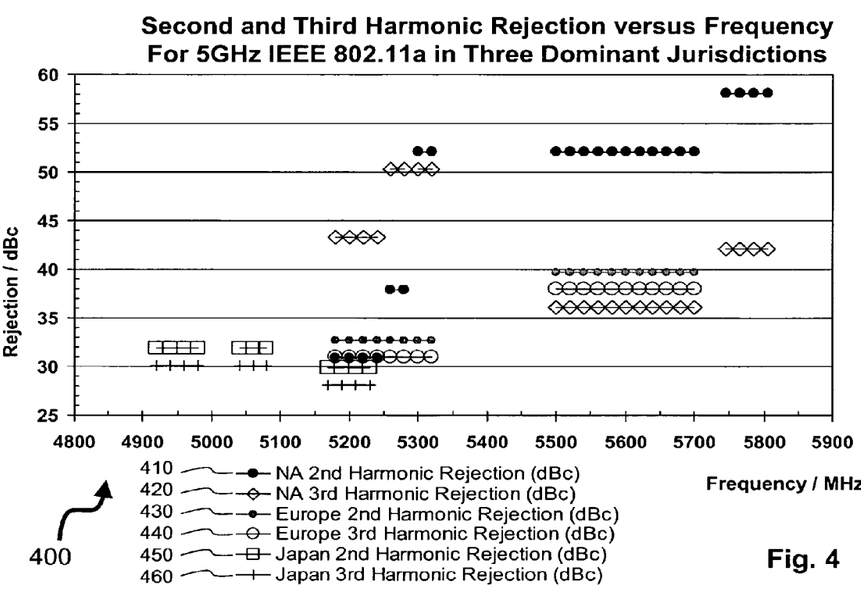
FIG. 4 illustrates the rejection required for second and third harmonic signals for a wireless transmitter operating according to IEEE 802.11a within the 5 GHz band for three regional jurisdictions.

Referring to FIG. 4, there is provided a fourth graphical representation 400 of another aspect of the regulatory requirements for transmitters. Here, FIG. 4 illustrates the rejection required for second and third harmonic signals for a wireless transmitter operating according to IEEE 802.11a within the 5 GHz band for three regional jurisdictions. Such second and third harmonic signals directly affect the interference such an IEEE 802.11a transmitter causes within other receivers. Plotted is North American 2nd Harmonic Rejection 410 which is approximately −31 dBr within North America U-NII-I 120, approximately −38 dBr for channels 52/56 in North America U-NII-2 150 rising to approximately −52 dBr for channels 60/64 of the same band, approximately −52 dBr for North America U-NII-2.5 170, and approximately −58 dBr for North America U-NII-3 180. In contrast, North American 3rd Harmonic Rejection 420 is approximately −43 dBr within North America U-NII-I 120, approximately −50 dBr in North America U-NII-2 150, and −36 dBr within North America U-NII-2.5 170, and approximately −42 dBr in North America U-NII-3 180.

In respect of the regional jurisdiction of Japan, the appropriate regulatory requirements specify a Japan 2nd Harmonic Rejection 450 as −32 dBr for Japan Band A 110 and approximately −30 dBr for Japan Band B 130, and then Japan 3rd Harmonic Rejection 460 is approximately −30 dBr for Japan Band A 110 and −28 dBr for Japan Band B 130. Finally, Europe requires that both Europe 2nd Harmonic Rejection 430 as approximately −33 dBr in Europe Band A 140 and approximately −40 dBr in Europe Band B 160 respectively, whilst and Europe 3rd Harmonic Rejection 440 is approximately −31 dBr in Europe Band A 140 and approximately −38 dBr in Europe Band B 160 respectively.

Figure 5:
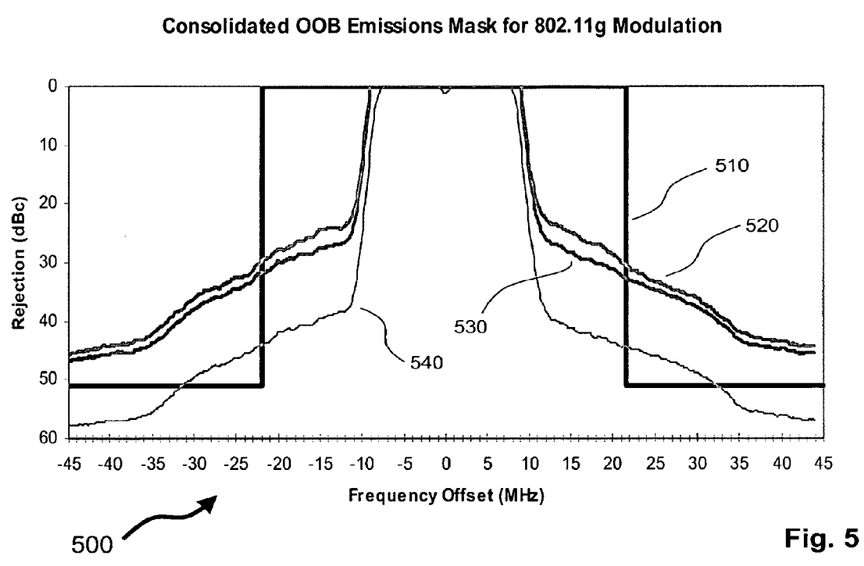
FIG. 5 illustrates an exemplary spectral mask for an IEEE 802.11g transmitter.

Accordingly, the requirements for providing an output signal from a wireless transmitter have many aspects including those presented supra in respect of allowed frequencies, maximum allowable output power, upper and lower band edge rejection, and second and third harmonic rejection. As a result, it is necessary for the equipment vendor to establish spectral masks within which the transmitter operates. An exemplary spectral emission mask template 500 for OOB compliance is shown if FIG. 5 for determining IEEE 802.11g transmitter compliance. As shown within the spectral mask template 500 the North America spectral mask 510 plots, as a function of frequency offset from the channel centre frequency, the maximum allowable OOB emissions from the IEEE 802.11g transmitter. Compliance within the North American jurisdiction requires that this North America spectral mask 510 is met when replicated onto each IEEE 802.11g channels, which for the North America regional jurisdiction have a maximum allowable transmitter output power is +30 dBm. Also shown in FIG. 5 is a first power spectrum 540 representing the emission from a transmitter at an output power of +17 dBm, where the transmitter OOB signal exceeds the North America spectral mask 510 in the region ±32 MHz to ±22 MHz.

Second and third power spectra 530 and 520 show the resulting change in spectral emissions at +18 dBm and +19 dBm respectively. It is evident therefore that the transmitter herein presented cannot operate at output powers above approximately +16 dBm and maintain compliance to the North America spectral mask 510. However, the transmitter would be compliant at maximum European regional allowed output of +17 dBm to the spectral mask for Europe, not shown for clarity, wherein an OOB rejection of −33 dBr is required. The transmitter is also compliant at +19 dBm, the maximum output power under jurisdiction in Japan (assuming 4 dBi antenna gain), wherein minimum allowable OOB rejection is −30 dBr.

Figure 6A:
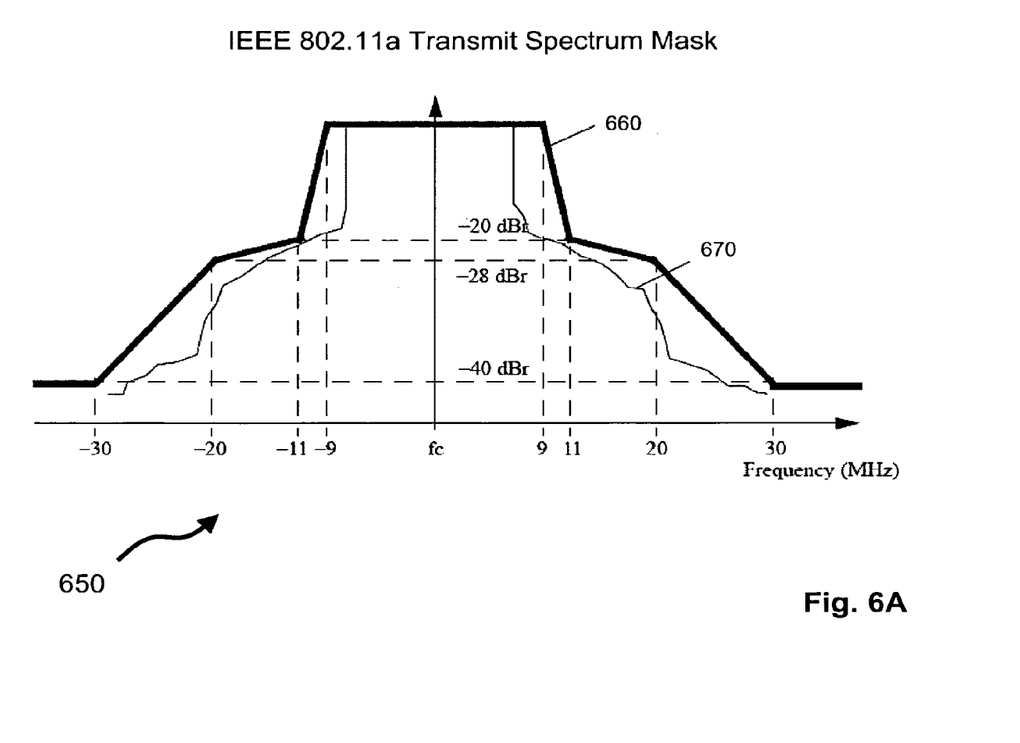
FIG. 6A illustrates an exemplary transmit spectral mask for an IEEE 802.11a transmitter.

Now referring to FIG. 6A illustrated is an exemplary 802.11a (hereafter referred to as '11a') transmit spectral mask 650 for an IEEE 802.11a transmitter. Accordingly, the 11a mask 660 is shown together with a typical 11a transmitter spectrum 670. The 11a mask 660 may be summarized as follows below in Table 1:

TABLE 1

IEEE 802.11a Transmitter Spectral Mask

| Offset/MHz | Maximum Signal/dBr |
|---|---|
| ±9 | 0 |
| ±11 | −20 |
| ±20 | −28 |
| ±30 | −40 |

However, as evidenced supra in respect of upper and lower emissions presented in respect of FIGS. 2 and 3, an emission mask for an IEEE 802.11a channel will vary according to the channel number. Also, a typical 802.11a OOB emission mask 610 as presented in FIG. 6B as part of the 802.11a OOB emissions graph 600 may exhibit asymmetry and additional structure to the 802.11 a transmitter spectral mask 660. The 802.11a OOB emission mask 610 may be summarized as follows below in Table 2.

TABLE 2

IEEE 802.11a Transmitter OOB Emission Mask

Figure 6B:
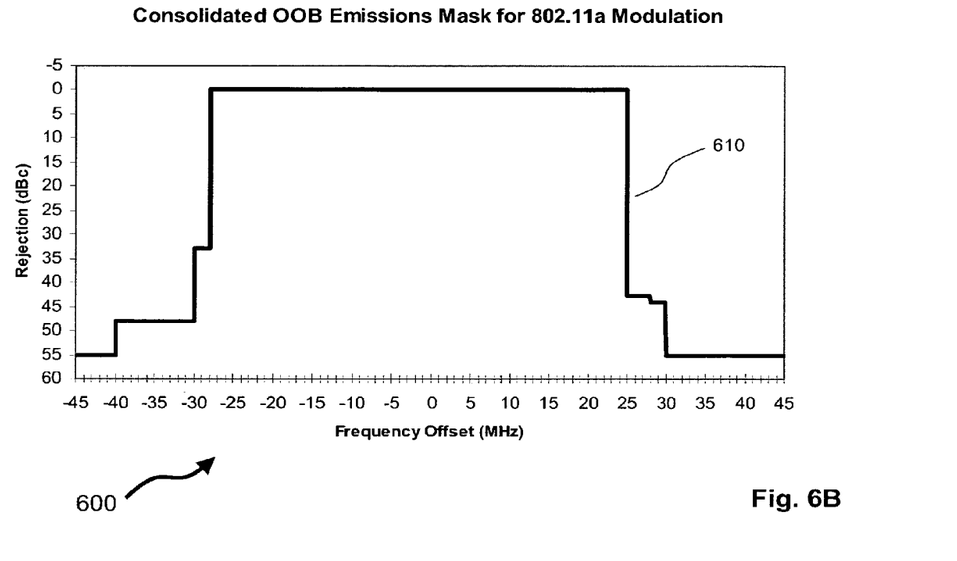
FIG. 6B illustrates an exemplary out-of-band spectral mask for an IEEE 802.11a transmitter.

| Frequency Offset of Mask Transition/MHz | Maximum Signal/dBr | |
|---|---|---|
| | Lower | Upper |
| −40 | −55.1 | −48.1 |
| −30 | −48.1 | −32.9 |
| −28 | −32.9 | 0 |
| +25 | 0 | −42.8 |
| +28 | −42.8 | −43.9 |
| +30 | −43.9 | −55.1 |

Accordingly, the requirements for a wireless transmitter vary substantially according to the jurisdiction within which the device is operating. As indicated supra the default, and simplest solution for the wireless device designer, is to provide a transmitter meeting the narrowest overlap in regional specifications. However, whilst this allows global roaming of the wireless device in compliance with the regional jurisdiction, it does so by sacrificing tradeoffs in performance within the other jurisdictions. Within the prior art, limited approaches to providing configuration of a wireless device based upon jurisdiction have been presented. A first example being that presented by J. T. Howard in patent GB 2,371,713 "Method and Apparatus for Pre-Configuring a Wireless Communication Device for Future Operation in a Distant Wireless Communication System" which addresses the issue of telecommunications operators establishing roaming arrangements with operators of different systems to enable their subscribers to operate on a different wireless access technology at the subscribers arrival within a new operators system.

Figure 7A:
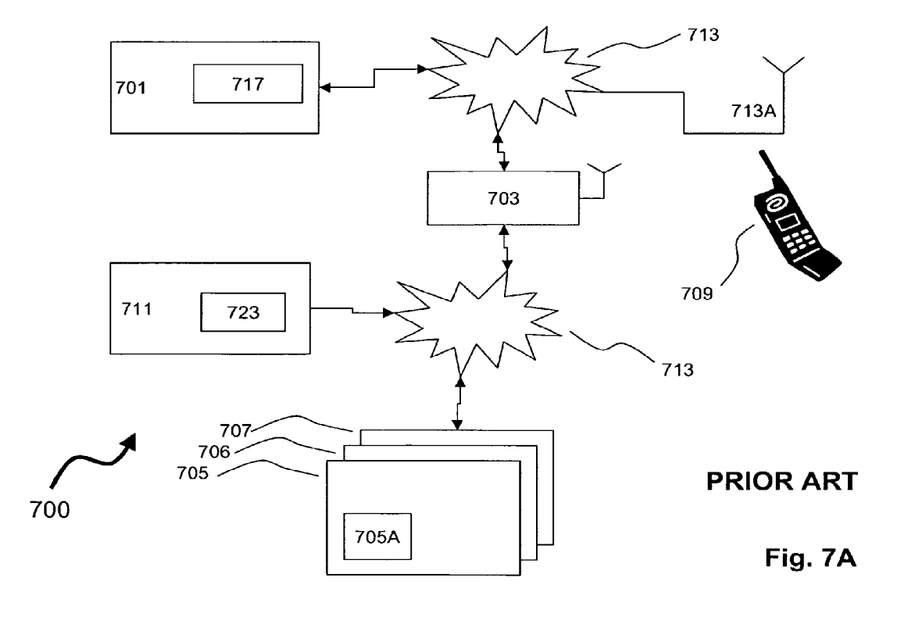
FIG. 7A illustrates a prior art approach to pre-loading configuration information for a wireless device based upon a current location and a planned trip.

Now referring to FIG. 7A there is shown a pre-configuration system 700 according to Howard for pre-configuring a wireless device 709 according to the destination and establishing appropriate entries into the new operators' system management systems. The pre-configuration system 700 has the user's wireless device 709 in normal wireless contact with a wireless base station 713A which is interconnected via a wide area network 713, such as an Internet Protocol (IP) network, to the home system 701 to which the user is currently registered. Additionally, the wireless device 709 is in wireless contact with a network configuration adaptor 703, which is a local wireless interconnection. The network configuration adaptor 703 is also interconnected via the wide area network 713 to a common carrier transportation system (CCTS) 711 and three regional carriers 705, 706, and 707.

In operation the user of wireless device 709 intends to make a journey that will remove them from the jurisdiction of their home system 701 and into that of first regional carrier 705 which has different configuration requirements to those of their home system 701. The user, for example, checks in at an airline terminal of an airport for a flight forming a portion of their journey. In doing so the user brings the wireless device 709 into range of the network configuration adaptor 703 which identifies the wireless device 709 and retrieves via the wide area network 713, from the users home system 701, stored personal data 717 relating to the user, for example their full name and passport number. This stored personal data 717 is then passed via the wide area network 713 to the CCTS 711 whereupon their itinerary 723 is retrieved indicating that they are about to board a flight from Rome, Italy to Nagasaki, Japan. The network configuration adaptor 703 therefore identifies this as an intended regional jurisdiction change and identifies that their home system 701 has a carrier agreement with first regional carrier 705, and retrieves from first regional carrier 705 appropriate configuration information 705A. This configuration information 705A is then used by network configuration adaptor 703 to transfer configuration settings to the wireless device 709.

However, Howard only teaches to the provision of necessary inter-carrier billing information, and establishment of frequency plans, such as the shift from IEEE 802.11a Europe, having two bands Europe Band A 140 and Europe Band B 160, to IEEE 802.11a Japan, having two different frequency bands, namely Japan Band A 110 and Japan Band B 130. In respect of the transmitter and receiver within the wireless device 709, the only adjustments are amending frequency allocation tables. As such, the approach outlined in GB 2,371,713 does not overcome the provisioning of the transmitter with a spectral output matching the narrowest overlap of all regional variations. Accordingly, there is no adjustment to the control parameters of the amplifier, filter, or other elements of the wireless device 709 that shape the emission spectrum or adjust output power. Further Howard, does not discuss the multiple frequency bands within each new jurisdiction and the potential for different transmitter configurations within each.

Figure 7B:
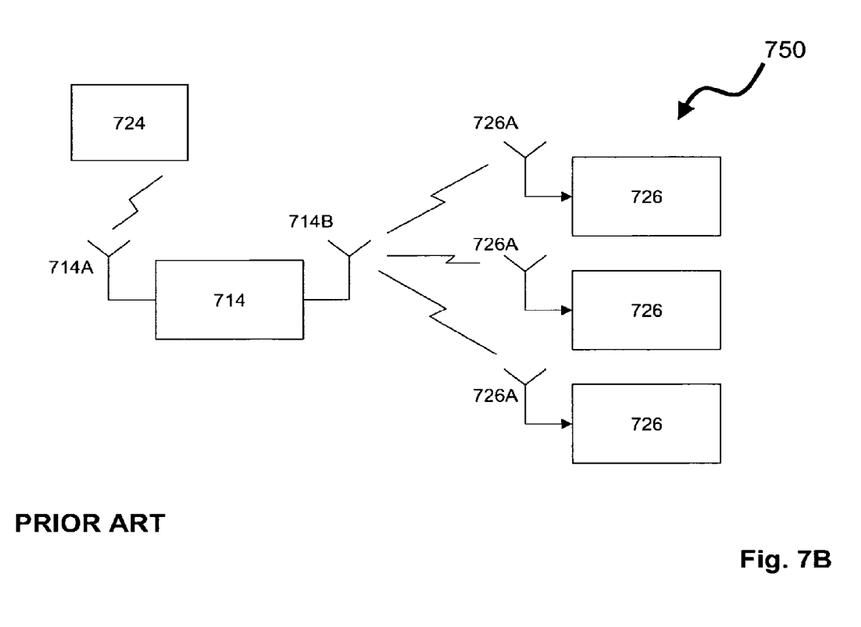
FIG. 7B illustrates a prior art approach of adjusting an operating frequency of an uncontrolled wireless device in response to geographical information.

A second approach from the prior art is presented in respect of wireless master slave network 750 in FIG. 7B as presented by A. K. Westerberg (US Patent 2005/0146460) "Functional Assembly with Automatic Adaptable Wireless Characteristics". Accordingly shown is a GPS provider 724 which is in wireless contact with a master controller 714, which is itself in wireless contact with slave units 726. As taught by Westerberg, the master controller 714 and slave units 726 are in communication solely with one another via master antenna 714B and slave antenna 726A according to a format such as an uncontrolled frequency within the ISM bands. The GPS provider 724 providing wireless GPS coordinate data to the master controller 714 via master GPS antenna 714A according to another other communication standard. The exemplary embodiment being an artificial pacemaker and the pacemaker controller.

As such, in operation the master controller 714 receives GPS coordinate data from the GPS provider 724. The master controller establishes that the latest coordinate data indicates that the user of the artificial pacemaker, not shown for clarity, but interconnected to a slave unit 726, has moved from one jurisdiction to another. If the current frequency transmitted from the master antenna 714B and received by slave antenna 726A, used to provide data to the slave unit 726 from the master controller 724, matches a frequency of known controlled transmission systems within the new jurisdiction then the master controller determines a new transmission frequency not covered by the new region standards and provides this to the slave unit 726 such that they adjust in an orderly manner to the new frequency.

It would be apparent therefore that the mapping of controlled frequencies within the master controller 724 need not be any more than a simple table of frequencies associated with that jurisdiction since all the master controller seeks to do is avoid these. Westerberg does not consider adjusting any other aspect of transmitter in the master controller 714 in response to the changes in GPS coordinate data.

As such, none of the prior art solutions address adjusting the operational characteristics of a transmitter within a wireless device to provide not only compliance to local jurisdiction regulations but also maximizing performance of the wireless device to the limits of these regulations. For example, adjusting the transmitter output power as the user moves from Japan to Europe, or adjusting output power as they move from a region operating according to North America Band U-NII-3 180 to North America Band U-NII-1 120 or vice-versa.

Figure 8:
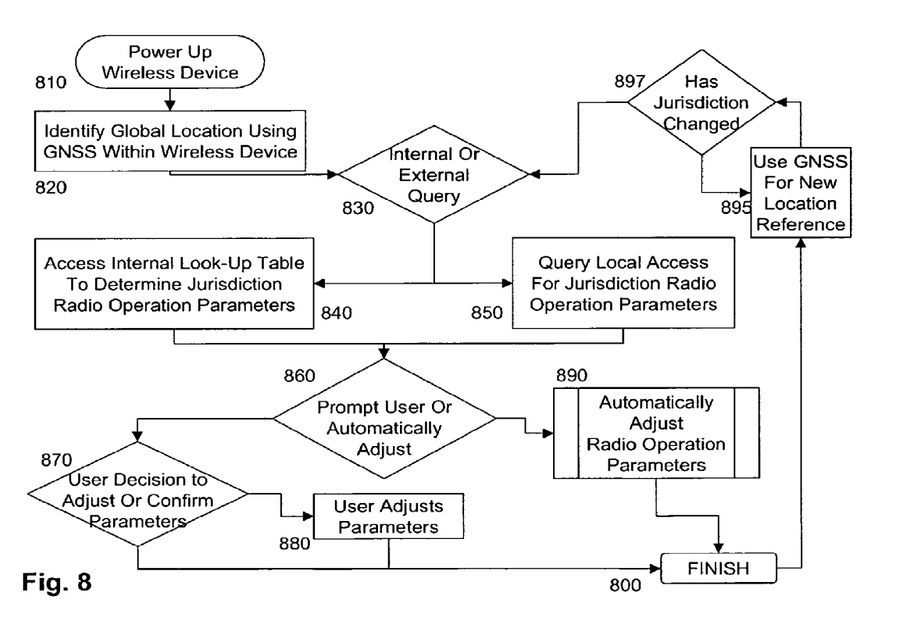
FIG. 8 illustrates an exemplary embodiment of the invention III respect of automatically configuring a wireless electronic device for jurisdiction compliance in response to a determination of a local jurisdiction.

Illustrated in FIG. 8 is an exemplary flow chart according to an embodiment of the invention in respect of automatically configuring a wireless electronic device for jurisdiction compliance in response to a determination of a local jurisdiction. At step 810 the wireless device is powered up and a global location established using a Global Navigation Satellite System (GNSS) within the wireless device at step 820. Using the GNSS coordinates, the process running within the electronic device performs a query at step 830 as to whether to make an internal or external determination of the jurisdiction based radio operation parameters.

If an internal determination is selected then the process moves forward to step 840 wherein a look-up table is used to determine the radio operational parameters applicable based upon the jurisdiction related to the GNSS coordinates. From step 840 upon retrieving the information from the look-up table the process moves forward to step 860 wherein a decision is made to prompt the user for a confirmation of making the necessary changes or whether they are to be automatically performed. If the decision at step 830 had been external query then the wireless device would trigger a query signal to be sent from the wireless device to local base stations prompting at least one of a plurality of potentially simultaneously accessible base stations to transfer configuration information based upon at least the GNSS data of the wireless device. A base station may, for example, support devices simultaneously within two jurisdictions, for example close to a border of two countries, or where the base station has multiple antennae supporting different wireless standards or bands of a single wireless standard. Such opportunistic establishment being beneficial in multi-standard electronic devices and adhoc networks.

Upon receiving from the base station the necessary jurisdiction data, the process would then also move forward to step 860 wherein a decision is made whether to prompt the user for confirmation or to have them performed automatically. If the decision is to perform such adjustments automatically then the process moves to step 890 and operation parameters are automatically adjusted, examples including, but not limited to, output power of transmitter, switching in or out different drivers or power amplifiers, and switching in different software data coding to match local standards. Alternatively, depending upon transmitter configuration other options exist such as switching in different bandwidths of transmission, changing the bandwidth of a power amplifier or switching in different tuning for the power amplifier thereby making the transmitter more efficient in some jurisdictions. Whilst the embodiments are described predominantly in respect of transmitters, similar tuning options exist within receivers such as optionally reducing scanning range of the tuner to narrow ranges, thereby improving efficiency and potentially reducing channel find time.

If, however, the user at step 860 selects confirmation of the parameter setting then the process moves to step 870 wherein the user is prompted to confirm or adjust parameters. In some instances, the user may optionally be prompted to select one wireless standard from a plurality, if for example the electronic device supports IEEE 802.11a and IEEE 802.11g and base stations for each are within range. Upon the user providing a simple selection of appropriate service the process moves to step 800 and finishes setting the electronic device configuration. If the user chooses to adjust specific parameters or select a sub-set of a specific standard then the process moves from step 870 to step 880 wherein the user inputs the necessary information before the process moves to step 800 and finishes.

From step 800 the process closes down the configuration setting process and moves to step 895 wherein a new location is extracted using the GNSS receiver. At step 897 a decision is made as to whether the jurisdiction has changed, if not the process loops back to step 895 and repeats a location determination using the GNSS receiver. If a jurisdiction change is detected then the process moves to step 830 and repeats the process outlined supra.

It would be apparent that some steps described as exclusive options may alternatively be performed in a predetermined sequence, such as using an internal look-up table to determine most of the jurisdiction parameters but poling the station for specific frequency information. Optionally, the look-up table may be sub-band specific, and may be subject to periodic updating using the transceiver within the electronic device. Also, whilst the process loops through steps 895 and 897 within the exemplary flow chart the loop may additionally contain a delay such that the jurisdiction is periodically checked. Optionally, the delay may be adjustable according to the determined location of the wireless device in respect of a boundary between jurisdictions, for example increasing location checks closer to the boundary.

Figure 9:
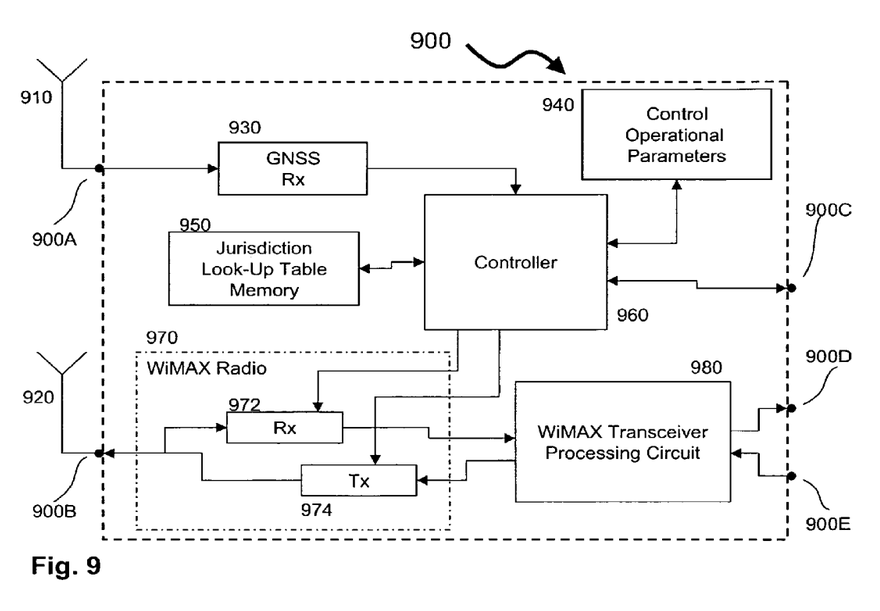
FIG. 9 illustrates an exemplary embodiment of the invention for jurisdiction compliance applied to a WiMAX IEEE 802.16 transmitter.

Now referring to FIG. 9 there is illustrated an exemplary embodiment of the invention for jurisdiction compliance applied to a WiMAX IEEE 802.16 transmitter 900. As shown, the WiMAX IEEE 802.16 transmitter 900 has a first antenna 910 electrically connected to a first input port 900A, and therein to a GNSS receiver 930. The GNSS receiver 930 is electrically connected to a host controller 960 such that the WiMAX IEEE 802.16 transmitter 900 can ascertain the necessary location information. The WiMAX IEEE 802.16 transmitter 900 has a second antenna 920 electrically connected to a first bidirectional port 900B and therein to WiMAX radio 970. The WiMAX radio 970 comprises receiver 972 and transmitter 974 which are both connected to WiMAX transceiver processing circuit 980. The WiMAX transceiver processing circuit 980 being electrically connected to first output port 900D, to provide the processed data received by the receiver 972, and second input port 900E to receive the data for subsequent transmission by the transmitter 974.

Each of the receiver 972 and transmitter 974 has electrical connections to the host controller 960 to receive configuration setting signals. In operation, the host controller 960, having obtained a location from the GNSS receiver 930, interfaces to a jurisdiction look-up table stored within jurisdiction look-up table memory 950. Based upon the retrieved jurisdiction information, the host controller determines whether to retrieve data from the jurisdiction look-up table or control operation parameter block 940 to provide the requisite adjustment signaling to the receiver 972 and transmitter 974. Alternatively, as described supra in respect of FIG. 8, the host controller seeks user input, in which event the host controller interacts with other elements of the host electronic device, not shown for clarity, via the second bidirectional port 900C.

It would be apparent that the WiMAX IEEE 802.16 transmitter 900 may contain additional transceivers supporting other wireless standards, including but not limited to IEEE 802.11a, IEEE802.11g, Bluetooth, and GSM. Such additional transceivers may be connected to the same second antenna 920 or alternatively have dedicated antenna, or be commoned to a third antenna, not shown for clarity.

Numerous other embodiments may be envisaged without departing from the spirit or scope of the invention.

What is claimed is:

1. A method to configure a wireless electronic device for jurisdiction compliance, the method comprising:
    with the wireless electronic device:
        periodically receiving, with a global navigation satellite system receiver of the wireless electronic device, global location signals indicative of a physical location of the wireless electronic device;
        extracting a first location signal received by the wireless electronic device, the first location signal indicative of a first physical location of the wireless electronic device;
        determining, a first operational jurisdiction based on the first location signal, the first operational jurisdiction associated with a first country and having a first set of operational parameters to be used in operation of a transmitter of the wireless electronic device while the wireless electronic device is located in the first operational jurisdiction;
        retrieving from a memory of the wireless electronic device the first set of operational parameters;
        delaying by an adjustable delay, an extraction of a second location signal received by the wireless electronic device, the second location signal indicative of a second physical location of the wireless electronic device, the adjustable delay based on a distance of the first physical location from a jurisdictional boundary between the first operational jurisdiction and a second operational jurisdiction; and
        after the adjustable delay, extracting the second location signal and determining the second operational jurisdiction for the wireless electronic device, the determination of the second operational jurisdiction based on the extracted second location signal, the second operational jurisdiction associated with a second country different from the first country and having a second set of operational parameters to be used in the operation of the transmitter while the wireless electronic device is located in the second operational jurisdiction.

2. The method of claim 1 further comprising determining whether the first operational jurisdiction has changed based on the second physical location of the wireless electronic device as indicated by the second location signal.

3. The method of claim 1 further comprising decreasing the adjustable delay when the first physical location is close to the jurisdictional boundary between the first and second operational jurisdictions.

4. The method of claim 1 further comprising increasing the adjustable delay when the first physical location is far from the jurisdictional boundary between the first and second operational jurisdictions.

5. The method of claim 1 further comprising enabling, based on the first operational jurisdiction, at least one of a first circuit configured to operate according to a first wireless standard and a second circuit configured to operate according to a second wireless standard.

6. The method of claim 5 further comprising at least one of adjusting an output power of the transmitter, changing a driver circuit, changing a power amplifier circuit, and changing software data coding of the enabled circuit based on an operational requirement of the first operational jurisdiction.

7. The method of claim 1 further comprising retrieving from a look-up table in the memory the first operational jurisdiction based on the first physical location.

8. The method of claim 7 further comprising retrieving from the look-up table at least one operational requirement of the first set of operational parameters.

9. A method to configure a wireless electronic device for jurisdiction compliance, the method comprising:
    with a wireless electronic device that includes a first circuit supporting data communications according to a first communications standard, a second circuit supporting data communications according to a second communications standard, a radio frequency transmitter, and a global navigation satellite system receiver configured to periodically receive global location signals indicative of a physical location of the wireless electronic device;
    extracting a first location signal received by the global navigation satellite system receiver, the first location signal indicative of a first physical location of the wireless electronic device;
    enabling the first circuit based at least in part on first jurisdictional parameters of a first operational jurisdiction associated with the first location signal, the first operational jurisdiction associated with a first country, the first jurisdictional parameters to be used in operation of the radio frequency transmitter while the wireless electronic device is located in the first operational jurisdiction;

delaying by an adjustable delay, an extraction of a second location signal received by the global navigation satellite system receiver, the second location signal indicative of a second physical location of the wireless electronic device, the adjustable delay based on the distance between the first physical location and a jurisdictional boundary between the first operational jurisdiction and a second operational jurisdiction; and after the adjustable delay, extracting the second location signal and determining a second operational jurisdiction that is based on the extracted second location signal, the second operational jurisdiction associated with the second circuit and a second country, and having second jurisdictional parameters to be used in the operation of the radio frequency transmitter while the wireless electronic device is located in the second operational jurisdiction.

10. The method of claim 9 further comprising determining the first operational jurisdiction based on the first physical location of the wireless electronic device as indicated by the first location signal.

11. The method of claim 9 further comprising decreasing the adjustable delay when the first physical location of the wireless electronic device as indicated by the first location signal is close to the jurisdictional boundary between the first and second operational jurisdictions.

12. The method of claim 9 further comprising determining whether the first operational jurisdiction has changed based on a second physical location of the wireless electronic device as indicated by the extracted second location signal.

13. A wireless electronic device for jurisdiction compliance comprising:
   a global navigation satellite system receiver configured to periodically receive location signals indicative of a physical location of the wireless electronic device;
   a first circuit configured to support data communications according to a first wireless communications standard, and a second circuit configured to support data communications according to a second wireless communications standard that is different from the first wireless communications standard;
   a processor configured to extract a first location signal received by the global navigation satellite system receiver and to enable the first circuit based at least in part on first jurisdictional parameters of a first operational jurisdiction associated with the first location signal that is indicative of a first physical location of the wireless electronic device, the first operational jurisdiction associated with a first country; and
   a transmitter configured to operate according to the first jurisdictional parameters of the first operational jurisdiction while the wireless electronic device is located in the first operational jurisdiction;
   the processor further configured to delay by an adjustable delay, an extraction of a second location signal received by the global navigation satellite system receiver, the second location signal indicative of a second physical location of the wireless device, the adjustable delay based on the distance between the first physical location and a jurisdictional boundary between the first operational jurisdiction and a second operational jurisdiction, after the adjustable delay, the processor further configured to extract the second location signal and to determine a second operational jurisdiction associated with the extracted second location signal, the second operational jurisdiction associated with the second circuit and a second country, and having a second set of operational parameters to be used in the operation of the transmitter while the wireless electronic device is located in the second operational jurisdiction.

14. The wireless electronic device of claim 13 wherein the adjustable delay decreases when the first physical location of the wireless electronic device as indicated by the first location signal is close to the jurisdictional boundary between the first and second operational jurisdictions.

15. The wireless electronic device of claim 13 wherein the adjustable delay increases when the first physical location of the wireless electronic device as indicated by the first location signal is far from the jurisdictional boundary between the first and second operational jurisdictions.

16. The wireless electronic device of claim 13 further comprising memory storing a look-up table that includes the first and second jurisdictional parameters.

* * * * *